(12) United States Patent
L'Heureux et al.

(10) Patent No.: US 8,706,865 B1
(45) Date of Patent: Apr. 22, 2014

(54) ENHANCED NETWORK COMMUNICATIONS USING DIAGNOSTIC INFORMATION

(76) Inventors: Israel L'Heureux, Monaco (MC); Mark D. Alleman, Portland, OR (US)

(*) Notice: Subject to any disclaimer, the term of this patent is extended or adjusted under 35 U.S.C. 154(b) by 153 days.

(21) Appl. No.: 12/985,341

(22) Filed: Jan. 6, 2011

(51) Int. Cl.
H04L 29/06 (2006.01)

(52) U.S. Cl.
USPC ............................................ 709/224; 709/221

(58) Field of Classification Search
USPC .................................. 709/223–235; 370/242
See application file for complete search history.

(56) References Cited

U.S. PATENT DOCUMENTS

| | | | |
|---|---|---|---|
| 6,625,135 B1* | 9/2003 | Johnson et al. | 370/332 |
| 6,658,010 B1* | 12/2003 | Enns et al. | 370/401 |
| 6,771,609 B1* | 8/2004 | Gudat et al. | 370/254 |
| 7,133,368 B2* | 11/2006 | Zhang et al. | 370/249 |
| 7,835,293 B2* | 11/2010 | Cidon et al. | 370/248 |
| 8,089,875 B2* | 1/2012 | Fraccalvieri et al. | 370/230.1 |
| 8,289,960 B2* | 10/2012 | Raja et al. | 370/389 |
| 2002/0051464 A1* | 5/2002 | Sin et al. | 370/466 |
| 2004/0225740 A1* | 11/2004 | Klemba et al. | 709/227 |
| 2006/0114911 A1* | 6/2006 | Nguyen | 370/395.4 |
| 2007/0230361 A1* | 10/2007 | Choudhury | 370/250 |
| 2009/0106571 A1* | 4/2009 | Low et al. | 713/310 |
| 2010/0082804 A1* | 4/2010 | Patel et al. | 709/224 |

OTHER PUBLICATIONS

Apostolopoulos, John, et al. On Multiple Description Streaming with Content Delivery Networks, Feb. 5, 2002, IEEE, pp. 1 11.*
Vakali, A. , Content Delivery Networks: Status and Trends, Nov.-Dec. 2003, Internet Computing, IEEE, pp. 68-74.*
Lee, C. W. , Routing Subject to Quality of Service Constraints in Integrated Communication Networks, 1995, IEEE, pp. 46-55.*

* cited by examiner

*Primary Examiner* — Farid Homayounmehr
*Assistant Examiner* — Olanrewaju Bucknor
(74) *Attorney, Agent, or Firm* — Michael J. Andri (57) ABSTRACT

A network communications method includes receiving, at a first networking device, a request for a network resource from a client device via a first communication path of a wide area network. The method includes obtaining first diagnostic information indicating an amount of transmission delay or packet loss for communications transmitted through the first communication path, and obtaining second diagnostic information for a second communication path between the client device and a second networking device. The method includes comparing the first and second diagnostic information to estimate whether the second communication path will enable faster transmission of communications than the first communication path. If the second communication path is estimated to enable faster transmission of communications, then the method further comprises serving data of the network resource or data of objects referenced by the network resource to the client device from the second networking device via the second communication path.

15 Claims, 4 Drawing Sheets

ENHANCED NETWORK COMMUNICATIONS USING DIAGNOSTIC INFORMATION

BACKGROUND

Communication networks such as the Internet's World Wide Web enable users to access information from data centers located around the globe. Information may be mirrored among a number of geographically diverse data centers to increase system redundancy and reduce network latency experienced by users of a communication network. However, transmission delays may be imposed on network communications by intermediate networking devices located along communication paths between users and remotely located data centers.

SUMMARY

Implementations for network communications are disclosed. As one example, a network communications method is disclosed that comprises receiving, at a first networking device, a request for a network resource from a client device via a first communication path of a wide area network. The first networking device being connectable to a first server in a first data center. The first server may be configured to serve a first instance of the network resource requested by the client device via the first networking device. The method further comprises obtaining first diagnostic information indicating an amount of transmission delay or packet loss for communications transmitted through a plurality of intermediate networking devices of at least a portion of the first communication path.

The method further comprises obtaining second diagnostic information indicating an amount of transmission delay or packet loss for communications transmitted through a plurality of intermediate networking devices of at least a portion of a second communication path of the wide area network between the client device and a second networking device being connectable to a second server in a second data center. The second server may be configured to serve a second instance of the network resource via the second networking device.

The method further comprises comparing the first diagnostic information and the second diagnostic information to estimate whether the second communication path will enable faster transmission of communications to the client device than the first communication path. If the second communication path is estimated to enable faster transmission of communications, then the method further comprises serving requested data to the client device from the second networking device via the second communication path.

Claimed subject matter, however, is not limited by this summary as other implementations are disclosed by the following written description and associated drawings.

DETAILED DESCRIPTION

Figure 1:
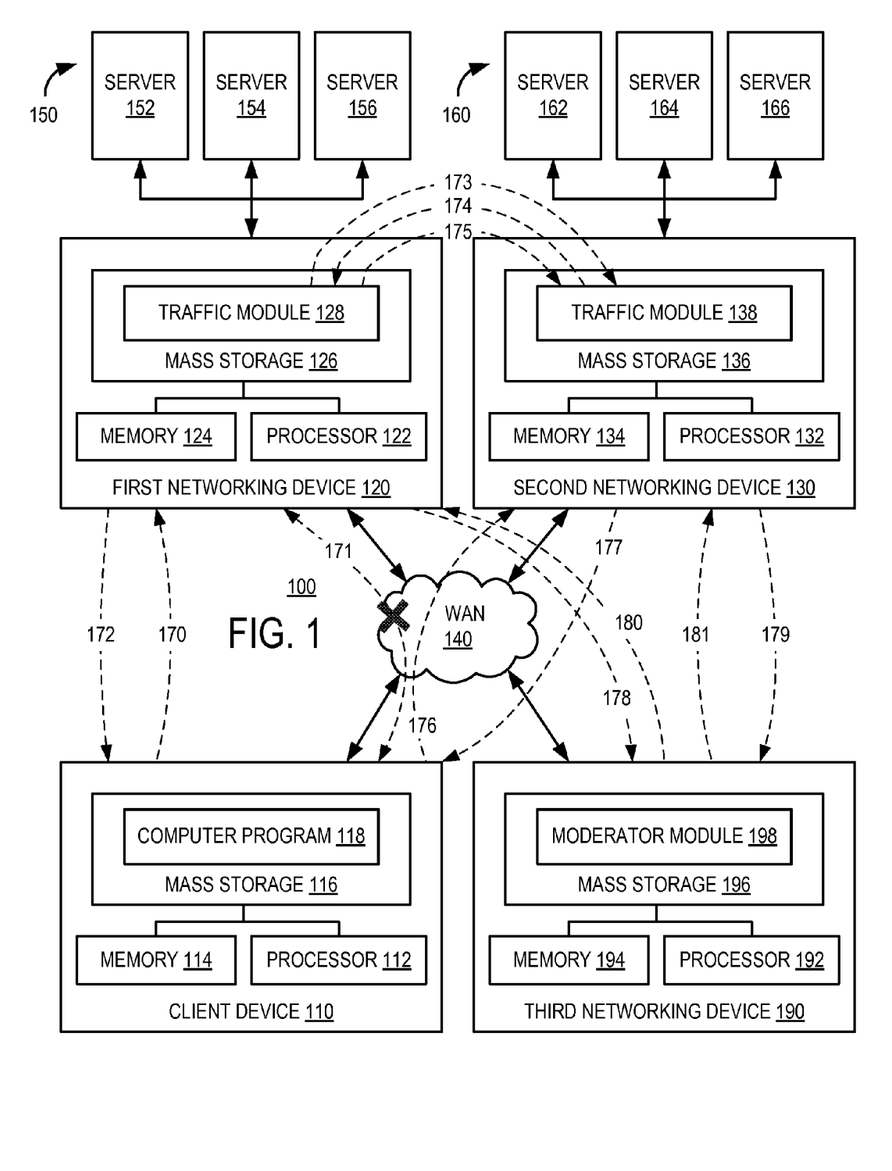
FIG. 1 is a schematic diagram depicting an example network environment.

FIG. 1 is a schematic diagram depicting an example network environment 100. Network environment 100 includes a client device 110, a first networking device 120, and a second networking device 130 that may communicate with each other via a wide area network (WAN) 140. WAN 140 may represent the Internet or a portion thereof, for example.

Client device 110 may comprise one or more processors such as processor 112, memory 114, and mass storage 116 having instructions such as computer program 118 stored thereon. Computer program 118 may be executed by processor 112 to perform one or more processes described in greater detail herein. Mass storage and memory may also be referred to as storage devices that may be used to store executable instructions or other suitable information.

In at least some implementations, computer program 118 may comprise a web browser application, a file browser application, or other suitable computer program for accessing information from remote data centers over WAN 140. As one example, computer program 118 may access information in the form of a network resource by sending a request 170 for the network resource to first networking device 120. In at least some implementations, requests sent by client device 110 for a network resource may comprise, for example, HTTP requests or other suitable requests, and may indicate the particular network resource that is requested by the client device.

A network resource may include, for example, an HTML object, a javascript object, a small web format (SWF) object, CSS object, etc. A network resource may include one or more references to one or more objects, such as image objects, video objects, audio objects, text objects, etc. For example, a network resource that is an HTML network resource may include one or more HTML references to objects to be requested and rendered as part of a common document or collection of information (e.g., webpage).

First networking device 120 may comprise one or more processors such as processor 122, memory 124, and mass storage 126 having instructions such as traffic module 128 stored thereon. Traffic module 128 may be executed by processor 122 to perform one or more processes described in greater detail herein.

In at least some implementations, second networking device 130 may be functionally identical or functionally similar to first networking device 120. For example, second networking device 130 may comprise one or more processors such as processor 132, memory 134, and mass storage 136 having instructions such as traffic module 138 stored thereon. Traffic module 138 may be executed by processor 132 to perform one or more processes described in greater detail herein. Where traffic module 128 of first networking device 120 is described as providing particular functionality, it will be understood that traffic module 138 of second networking device 130 may be configured to provide the identical functionality or similar functionality as traffic module 128, and vice-versa.

Client device 110, first networking device 120, and second networking device 130 may be geographically remote from each other. The term geographically remote may refer to diversity of geographic location by a distance of miles. For example, client device 110 may be located in a different state, province, country, or continent from first networking device 120 or second networking device 130. As another example, first networking device 120 may be located in a different state, province, country, or continent from second networking device 130 or client device 110. Network environment 100 may include any suitable number of client devices or networking devices in addition to client device 110, first networking device 120, and second networking device 130.

First networking device 120 may be connectable to one or more servers in a first data center 150, including servers 152, 154, and 156, for example. Second networking device 130 may be connectable to one or more servers in a second data center 160, including servers 162, 164, and 166, for example. First data center 150 and first networking device 120 may be geographically remote from second data center 160 and second networking device 130 in at least some implementations. First networking device 120 being connectable to data center 150 and second networking device 130 being connectable to data center 160 may collectively comprise a network communications system with which client device 110 may request and receive information.

In at least some implementations, first networking device 120 and second networking device 130 may comprise load balancers or may provide load balancing functionality for respective data centers 150 and 160. Second data center 160 may be considered a minor data center of first data center 150 if second data center 160 includes one or more servers having at least one network resource in common with one or more servers of first data center 150. A network resource in common with two or more data centers may also be referred to as a mirror network resource. One or more servers of second data center 160 may be referred to as mirror servers of one or more servers of first data center 150 with respect to one or more network resources. A network resource may comprise information of any suitable referent of a Uniform Resource Identifier (URL) or Internationalized Resource Identifier (IRL), for example.

In at least some implementations, traffic module 128 of first networking device 120 is configured to receive a request for a network resource from client device 110 via a first communication path of wide area network 140. The first communication path of wide area network 140 may include a plurality of intermediate networking devices. An intermediate networking device may include, for example, a gateway device, a router device, a bridge device, a switch device, a hub device, a repeater device, or other suitable networking device.

In at least some implementations, traffic module 128 is configured to obtain first diagnostic information indicating an amount of transmission delay or packet loss for communications transmitted through a plurality of intermediate networking devices of at least a portion of the first communication path between client device 110 and first networking device 120. For example, as indicated at 171, transmission delay may be caused by packet loss or congestion at one or more intermediate networking devices of the first communication path of WAN 140 between client device 110 and first networking device 120. Traffic module 128 may be configured to obtain the first diagnostic information by measuring a round trip time for the communications transmitted through the plurality of intermediate networking devices of at least the portion of the first communication path between first networking device 120 and client device 110. Alternatively or additionally, traffic module 128 may perform an Internet Control Message Protocol trace route of at least the portion of the first communication path between the first networking device and the client device or other suitable network node along the first communication path to obtain the first diagnostic information for the first communication path.

In at least some implementations, traffic module 128 is configured to obtain second diagnostic information indicating an amount of transmission delay or packet loss for communications transmitted through a plurality of intermediate networking devices of at least a portion of a second communication path of the wide area network between client device 110 and second networking device 130. In at least some implementations, traffic module 128 may be configured to obtain the second diagnostic information from second networking device 130 by sending a request 173 for the second diagnostic information from first networking device 120 to second networking device 130. The request 173 for the second diagnostic information may identify a target network node with which the second networking device is to establish and diagnose the second communication path. Traffic module 128 may be configured to receive from second networking device 130, in response to the request for the second diagnostic information, a response 174 that includes the second diagnostic information for the second communication path.

In at least some implementations, traffic module 128 may be configured to determine that the signal transmission delay or the packet loss exists in at least the portion of the first communication path based, at least in part, on the first diagnostic information. Traffic module 128 may be configured to obtain the second diagnostic information from second networking device 130 in response to determining that the signal transmission delay or the packet loss exists or exceeds a threshold level in at least a portion of the first communication path. In some implementations, traffic module 128 may be configured to periodically obtain first diagnostic information and/or second diagnostic information according to a predefined schedule.

In at least some implementations, traffic module 128 may be configured to obtain the second diagnostic information by rewriting the network resource to add a reference to an additional object (e.g., via pixel insertion or other suitable approach) or modify a network address of one or more of the objects referenced by the network resource. First networking device 120 may send the rewritten network resource as indicated at 172 to client device 110 in response to receiving the request 170 for the network resource from client device 110. The rewritten network resource may to cause client device 110 to request, from second networking device 130 via the second communication path, the one or more objects at the modified network address or the additional object as indicated at 176.

The modified network address or the reference to the additional object may correspond to a network address of second networking device 130 or the second server connectable to the second networking device. The second networking device may measure or identify the second diagnostic information based, at least in part, on communications between the second networking device and a target network node (e.g., the client device). The second diagnostic information may be based, at least in part, on a round trip time for communications sent (e.g., 176) and received (e.g., 177) through at least the portion of the second communication path between second networking device 130 and client device 110 for the additional object, or one or more objects having a modified reference. Alternatively or additionally, traffic module 138 may perform an Internet Control Message Protocol trace route of at least the portion of the second communication path between the second networking device and the client device to obtain the second diagnostic information for the second communication path. First network device 120 may receive the second diagnostic information from second networking device 130 as indicated at 174.

In at least some implementations, traffic module 128 is configured to compare the first diagnostic information and the second diagnostic information to estimate whether the second communication path will enable faster transmission of communications to the client device than the first communication path. The first diagnostic information and the second diagnostic information may each comprise one or more of latency indicating data, performance indicating data, or congestion indicating data, for example. Diagnostic information may include one or more time stamps (e.g., ACK receipt times) representing a time at which diagnostic measurements where performed. If the second communication path is estimated to enable faster transmission of communications to the client device than the first communication path, traffic module 128 may be configured to initiate a process whereby data is served to the client device from the second networking device via the second communication path. Data may be additionally served to the client device from the first networking device via the first communication path, yet establishing additional paths of communication to a second networking device supporting faster transmission of communications may serve to reduce transmission delay experienced by the client device.

If a number of networking devices supporting faster communication paths have been identified, then a networking device that supports a particular session type engaged in or requested by the client device may be selected as the communication path by which the client device is directed. If, however, a networking device does not support a particular session type, then that networking device may not be selected for the alternate communication path even if that communication path to the client device is faster than an existing communication path. For example, some session types such as sessions involving secure financial transactions may not be handed off to second networking device 130, whereas other session types such as sessions involving streaming media may be handed off to second networking device 130.

As one example, traffic module 128 may be configured to send a redirect message (e.g., an HTTP 302 redirect message) as indicated at 172 to client device 110 to cause client device 110 to request data of the network resource, data of objects referenced by the network resource, or other suitable data requested by client device 110 from second networking device 130 via the second communication path as indicated at 176. As another example, traffic module 128 may be configured to rewrite the network resource to modify a network address of one or more of the objects referenced by the network resource to cause client device 110 to request, via the second communication path, the one or more objects at the modified network address in response to receiving the network resource from the networking device via the first communication path. The modified network address may correspond to a network address of second networking device 130 or the second server connectable to second networking device 130.

Second networking device 130 may receive (e.g., 176) and respond (e.g., 177) to requests from client device 110 for data of the network resource, data of the one or more objects referenced by the network resource, or other suitable data. In at least some implementations, second networking device may retrieve data requested by client device 110 from the second server of 160. In at least some implementations, second networking device 130 may be configured to forward requests received from client device 110 via the second communication path to first networking device 120 for processing. First networking device 120 may be configured to receive the forwarded requests from second networking device 130, and respond to the forwarded requests by sending responses to second networking device 130. Second networking device 130 may be configured to forward the responses received from first networking device 120 to client device 110 via the second communication path, thereby routing client requests around the first communication path where transmission delay or packet loss were identified.

If, however, the first communication path is estimated by comparing the first diagnostic information and the second diagnostic information to enable faster or comparable transmission of communications to the client device than the second communication path, then first networking device 120 may continue serving or may begin to serve data of the network resource, data of objects referenced by the network resource, or other suitable data to client device 110 from first networking device 120 via the first communication path.

In at least some implementations, traffic module 128 of first networking device 120 may be configured to duplicate a session state at second networking device 130 between client device 110 and first networking device 120. As one example, traffic module 128 may be configured to send session state information to second networking device 130 identifying client device 110 as indicated at 175. Second networking device 130 may receive the session state information sent by first networking device and duplicate the session state for client device 110 based, at least in part, on the session state information. As one example, the session state information may identify a byte range or byte location in a data stream being sent to the client device by the first networking device so that the second networking device may duplicate the session state and enable the client device to continue receiving the data stream from the second networking device.

The previously described traffic module 128 is configured to obtain the first and second diagnostic information, compare the first and second diagnostic information, and transfer data serving from first networking device 120 to second networking device 130 if faster transmission of communications are available via the second communication path. However, in some implementations, at least some of previously described functionality of traffic module 128 may be provided by moderator module 198 of a third networking device 190 and/or computer program 118 of client device 110.

As one example, network environment 100 further comprises a third networking device that includes a processor 192, memory 194, and mass storage 196 having instructions such as moderator module 198 stored thereon. Moderator module 198 of third networking device 190 that may be configured to obtain the first diagnostic information from first networking device 120 (e.g., 178) and the second diagnostic information from second networking device 130 (e.g., 179) via WAN 140. Moderator module 198 may be configured to compare the first diagnostic information and the second diagnostic information at third networking device 190. Moderator module 198 may be configured to command (e.g., via 180 and/or 181) one or more of first networking device 120 or second networking device 130 to facilitate serving data to client device 110 based, at least in part, on the comparison of the first and second diagnostic information. Moderator module 198 may be configured to serve data to client device 110 via a fastest communication path of the first and second communication paths.

As another example, computer program 118 of client device 110 may be configured to obtain the first diagnostic information at client device 110. For example, computer program 118 may identify or measure a round trip time for communications between client device 110 and first networking device 120 via the first communication path. Computer program 118 may be configured to obtain the second diagnostic information at client device 110 from second networking device 130 by (1) receiving a network address of second networking device 130 from the first networking device 120 (e.g., via a rewritten network resource received from first networking device 120), (2) sending and receiving communication messages transmitted through the plurality of intermediate networking devices of at least the portion of the second communication path between client device 110 and second networking device 130, and (3) measuring a round trip time at client device for the communication messages sent and received through the plurality of intermediate networking devices of at least the portion of the second communication path. The second diagnostic information based, at least in part, on the round trip time measured or identified by computer program 118.

Alternatively or additionally, computer program 118 may be configured to perform an Internet Control Message Protocol (ICMP) trace route of at least the portion of the first communication path between the first networking device and the client device to obtain the first diagnostic information for the first communication path. Computer program 118 may be configured to perform an Internet Control Message Protocol trace route of at least the portion of the second communication path between the second networking device and the client device to obtain the second diagnostic information for the second communication path.

Computer program 118 may be configured to compare the first diagnostic information and the second diagnostic information at client device 110 to estimate whether the second communication path will enable faster transmission of communications to client device 110 than the first communication path. If the first communication path is estimated to enable faster or comparable transmission of communications relative to the second communication path, then computer program 118 may be configured to continue or begin requesting data of the network resource, data of one or more objects referenced by the network resource, or other suitable data from first networking device 120 via the first communication path. If the second communication path is estimated to enable faster transmission of communications than the first communication path, then computer program 118 may be configured to request data of the network resource, data of the one or more objects referenced by the network resource, or other suitable data from second networking device 130 via the second communication path.

Figure 2:
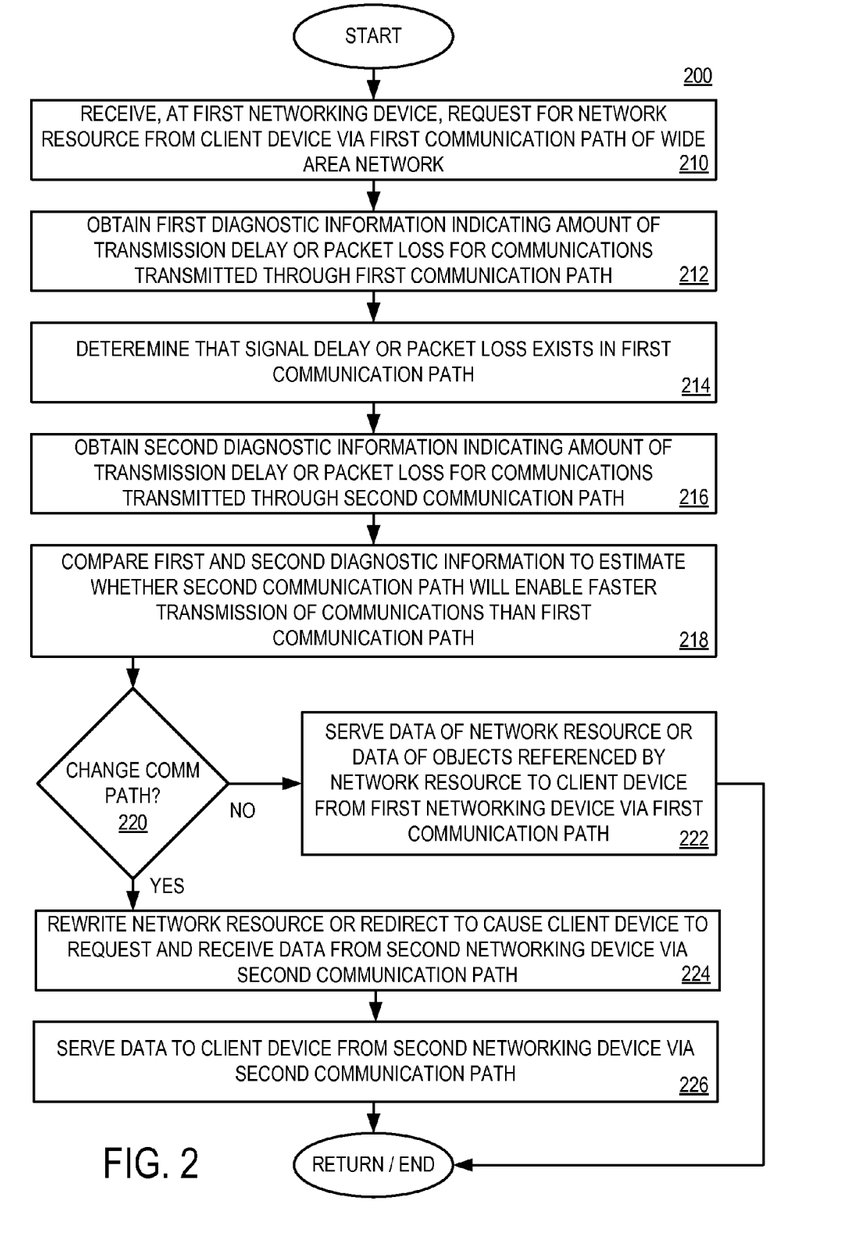
FIG. 2 is a flow diagram depicting an example network communications method.

FIG. 2 is a flow diagram depicting an example network communications method 200. Method 200 may be performed, at least in part, by previously described traffic module 128, for example. However, depending on implementation, method 200 may be performed collectively by a combination of traffic module 128, traffic module 138, computer program 118, and/or moderator module 198 as described in greater detail with reference to FIG. 2.

Operation 210 comprises receiving, at a first networking device, a request for a network resource from a client device via a first communication path of a wide area network. The request may comprise an HTTP request, for example, and may indicate the network resource requested by the client device. The first networking device may be connectable to a first server in a first data center. The first server may be configured to serve a first instance of the network resource requested by the client device via the first networking device.

Operation 212 comprises obtaining first diagnostic information indicating an amount of transmission delay or packet loss for communications transmitted through a plurality of intermediate networking devices of at least a portion of the first communication path. In at least some implementations, operation 212 for obtaining the first diagnostic information comprises measuring a round trip time at the first networking device for the communications transmitted through the plurality of intermediate networking devices of at least the portion of the first communication path between the first networking device and the client device.

Operation 214 comprises determining that the signal transmission delay or the packet loss exists in at least the portion of the first communication path based, at least in part, on the first diagnostic information. In at least some implementations, determining that transmission delay or packet loss exists comprises statistically analyzing a group of connections to client devices handled by the first networking device, and identifying outlying connection states of the group of connections analyzed. In at least some implementations, determining that transmission delay or packet loss exists comprises comparing the first diagnostic information to one or more predetermined thresholds indicating that transmission delay or packet loss exists. The predetermined thresholds may be defined based on the statistically analyzed group of connections, for example.

Operation 216 comprises obtaining second diagnostic information indicating an amount of transmission delay or packet loss for communications transmitted through a plurality of intermediate networking devices of at least a portion of a second communication path of the wide area network between the client device and a second networking device. The second networking device being connectable to a second server in a second data center. The second server may be configured to serve a second instance of the network resource via the second networking device.

In at least some implementations, operation 216 for obtaining the second diagnostic information comprises sending a request for the second diagnostic information from the first networking device to the second networking device, and receiving from the second networking device, in response to the request for the second diagnostic information, a response that includes the second diagnostic information.

The first diagnostic information and the second diagnostic information may each comprise one or more of latency indicating data, performance indicating data, or congestion indicating data for respective first and second communication paths. In at least some implementations, operation 216 for obtaining the second diagnostic information comprises obtaining the second diagnostic information at the first networking device in response to determining that the signal transmission delay or the packet loss exists in at least the portion of the first communication path as previously described with reference to operation 214, for example.

Operation 218 comprises comparing the first diagnostic information and the second diagnostic information to estimate whether the second communication path will enable faster transmission of communications to the client device than the first communication path, and if so operation 222 comprises serving data of the network resource, data of objects referenced by the network resource, or other suitable data requested by the client device to the client device from the second networking device via the second communication path. Hence, the decision at 220 of whether to change communication paths may be based, at least in part, on the comparison of the first diagnostic information and the second diagnostic information.

In at least some implementations, diagnostic information may further indicate a TCP/IP setup time. For example, the second diagnostic information may indicate an actual measured TCP/IP setup time or an estimated TCP/IP setup time for second client device to connect to the second networking device. Comparison of the first networking device and the second networking device may include adding the measured or estimated TCP/IP setup time to the round trip time measured or estimated for the second communication path to determine whether it is faster to maintain communications via an existing TCP/IP connection with the first networking device via the first communication path or establish a new TCP/IP connection with a second networking device via the second communication path.

In at least some implementations, operation 226 for serving data to the client device from the second networking device may further include or may be preceded by operation 224 that comprises rewriting the network resource or redirecting the client device (e.g., via an HTTP 302 redirect message) to cause the client device to request and receive the data of the network resource, data of one or more objects referenced by the network resource, or other suitable data requested by the client device from the second networking device via the second communication path. In at least some implementations, operations 224 and/or 226 may be performed only for network resources requested by a client device that include one or more references to one or more other objects that may be requested by the client device, such as for example, HTML, Javascript, SWF, and CSS. However, in at least some implementations, operations 224 and/or 226 may be performed for some or all data requested by a client device.

As one example, operation 224 may comprise rewriting the network resource at the first networking device to modify a network address of one or more of the objects referenced by the network resource to cause the client device to request, via the second communication path, the one or more objects at the modified network address in response to receiving the network resource from the first networking device via the first communication path. The modified network address may correspond to a network address of the second networking device or the second server connectable to the second networking device.

As another example, operation 224 may comprise redirecting the client device from the first networking device to request the data of the network resource, the data of the objects referenced by the network resource, or other suitable data requested by the client device to the second networking device to facilitate serving the data to the client device by second networking device via the second communication path. In at least some implementations, serving the data to the client from the second networking device may comprise duplicating at the second networking device, a session state between the client device and the first networking device. Session state information may be sent to the second networking device, for example, by the first networking device to enable the second networking device to duplicate the session state.

If, however, the first communication path is estimated by comparing the first diagnostic information and the second diagnostic information to enable faster transmission or comparable transmission of communications to the client device than the second communication path, then operation 226 comprises serving data of the network resource, data of objects referenced by the network resource, or other suitable data requested by the client device to the client device from the first networking device via the first communication path. From operations 222 or 226, the process flow of method 200 may return or end.

In at least some implementations, operation 216 for obtaining the second diagnostic information comprises rewriting the network resource to add a reference to an additional object (e.g., via pixel insertion or other suitable approach) or modify a network address of one or more of the objects referenced by the network resource to cause the client device to request, via the second communication path, the one or more objects at the modified network address or the additional object. The modified network address or the reference to the additional object may correspond to a network address of the second networking device or the second server connectable to the second networking device. Operation 216 for obtaining the second diagnostic information may further comprise receiving the second diagnostic information from the second networking device. The second diagnostic information may be based, at least in part, on a round trip time for communications sent and received through at least the portion of the second communication path between the second networking device and the client device for the additional object, or the one or more objects having the modified reference.

In at least some implementations, operation 212 for obtaining the first diagnostic information may comprise obtaining the first diagnostic information at a third networking device from the first networking device. Operation 216 for obtaining the second diagnostic information may comprise obtaining the second diagnostic information at the third networking device from the second networking device. Operation 218 for comparing the first diagnostic information and the second diagnostic information may comprise comparing the first diagnostic information and the second diagnostic information at the third networking device. In such implementations, method 200 may further comprise commanding one or more of the first networking device or the second networking device to facilitate serving of the data of the network resource or the data of the objects referenced by the network resource to the client device from the second server via the second networking device. For example, if the second communication path is estimated to enable faster transmission of communication than the first communication path, the third networking device may command the first networking device to rewrite the network resource or redirect the client device to cause the client device to request data from the second networking device via the second communication path.

In at least some implementations, operation 212 for obtaining the first diagnostic information may comprise obtaining the first diagnostic information at the client device. Operation 216 for obtaining the second diagnostic information may comprise obtaining the second diagnostic information at the client device by: (1) receiving at the client device from the first networking device, a network address of the second networking device, (2) sending and receiving communication messages transmitted through the plurality of intermediate networking devices of at least the portion of the second communication path between the client device and the second networking device, and (3) measuring a round trip time at the client device for the communication messages sent and received through the plurality of intermediate networking devices of at least the portion of the second communication path. The second diagnostic information may be based, at least in part, on the round trip time. Operation 218 for comparing the first diagnostic information and the second diagnostic information may be performed at the client device in such implementations. The client device may be configured to request data from the faster communication path of the first and second communication paths compared by the client device.

Operation 226 for serving the data of the network resource or the data of the objects referenced by the network resource from the second networking device via the second communication path may be performed by the client device in response to a request sent by the client device to the second networking device via the second communication path. In at least some implementations, the second networking device may retrieve the requested data from the second server, and serve the requested data to the client device. However, in at least some implementations, operation 226 for serving data of the network resource or data of objects referenced by the network resource to the client from the second networking device may comprise: (1) forwarding requests received from the client device via the second communication path at the second networking device to the first networking device for processing, (2) receiving, at the first networking device, the forwarded requests from the second networking device; and (3) responding to the forwarded requests by sending responses from the first networking device to the second networking device, and (4) forwarding the responses received by the second networking device from the second networking device to the client device via the second communication path.

Figure 3:
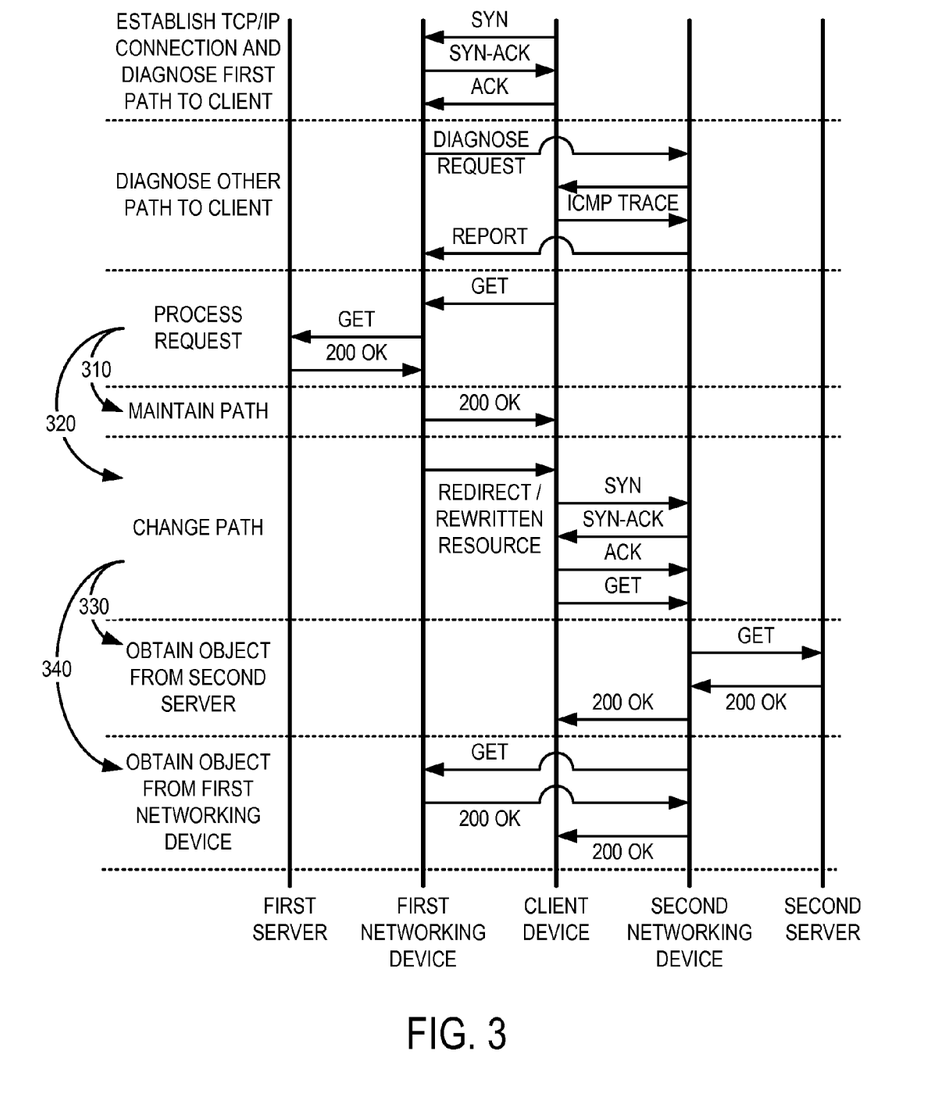
FIG. 3 is a networking diagram depicting an example of network communications.

FIG. 3 is a networking diagram depicting an example of network communications. A client device may establish a TCP/IP connection with a first networking device via a three-way handshake including exchange of SYN, SYN-ACK, and ACK messages over a first communication path of a wide area network. The first networking device may obtain first diagnostic information based, at least in part, on a round trip time between the first networking device sending the ACK message to the client device and receiving the SYN-ACK message sent by the client device. In other implementations, the client device may obtain first diagnostic information based, at least in part, on a round trip time between the client device sending the SYN message and receiving the SYN-ACK message from the first networking device via the first communication path.

After or in response to the client device establishing the TCP/IP connection with the first networking device, the first networking device may send a diagnostic information request message to a second networking device. The diagnostic information request message may identify one or more target network nodes to which a second communication path is to be diagnosed. As one example, the target network node may include the client device, an intermediate networking device located along the second communication path between the second networking device and the client device, or another suitable network node located nearby the client device within the network. In response to receiving the diagnostic information request message, the second networking device may perform an Internet Control Message Protocol trace route of at least a portion of the second communication path between the second networking device and the target network node (e.g., the client device) identified by the diagnostic information request message to obtain second diagnostic information for the second communication path. The target network node receives the ICMP message sent by the second networking device and in response to receiving the ICMP message, sends a response message to the second networking device via the second communication path. The second networking device may measure or identify the second diagnostic information for the second communication path based, at least in part, on the round trip time of the ICMP message and ICMP response message.

The second networking device sends the second diagnostic information for the second communication path to the first networking device via the wide area network as a diagnostic report message. The first networking device receives the diagnostic report message sent by the second networking device via the wide area network. The first networking device compares the first diagnostic information for the first communication path and the second diagnostic information for the second communication path to estimate whether the second communication path enables faster transmission of communications than the first communication path.

The client device, after establishing the TCP/IP connection with the first networking device, may send an HTTP GET message to the first networking device to request a network resource. The first networking device, in response to receiving the request for the network resource from the client device, may request the network resource from the first server. The first server may respond to the request for the network resource from the first networking device by sending a response message that includes the network resource such as an HTTP 200 OK message, for example.

Based on the comparison of the first and second diagnostic information, the first networking device may maintain the first communication path for serving data of the network resource, data of one or more objects referenced by the network resource, or other suitable data to the client device by sending response messages to the client device such as, for example, the HTTP 200 OK message as indicated at 310. For example, the first networking device may maintain the first communication path for serving data to the client device if the first communication path enables faster or comparable transmission of data to the client device as compared to the second communication path.

If the second communication path is estimated to enable faster transmission of data to the client device than the second communication path, then the first networking device may change the communication path for the client device to the second communication path. As previously described, the first networking device may rewrite the network resource requested by the client device to cause the client device to request data of objects referenced by the network resource from the second networking device. The first networking device may send the rewritten network resource to the client device. Alternatively or additionally, the first networking device may redirect (e.g., via an HTTP 302 redirect message) the client device to request data of objects referenced by the network resource or other suitable data from the second networking device via the second communication path.

The client device receives the rewritten network resource or the redirect message sent by the first networking device. In response to receiving the rewritten reference or redirect message, the client device establishes a TCP/IP connection with the second networking device via a three-way handshake including exchange of SYN, SYN-ACK, and ACK messages. After establishing the TCP/IP connection with the second networking device, the client device requests data from the second networking device via the second communication path, for example, as an HTTP GET message.

The second networking device receives the request for the data from the client device via the second communication path, and processes the request. The second networking device may process the request by retrieving the requested data from the second server as indicated at 330, or retrieves the requested data from the first networking device as indicated at 340. The second networking device, after retrieving the requested data from the second server or the first networking device, sends the requested data to the client device via the second communication path of the wide area network.

Figure 4:
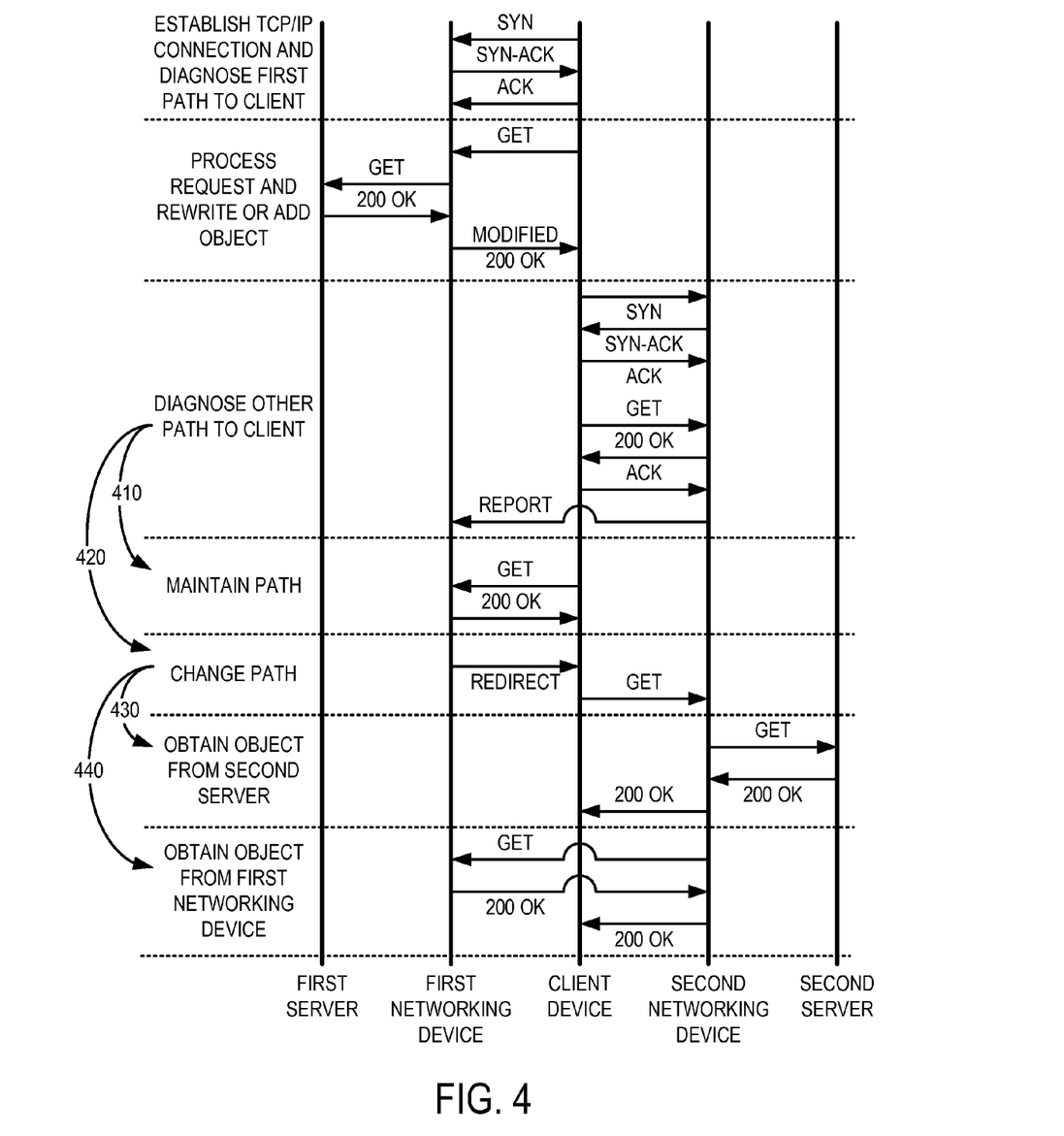
FIG. 4 is a network diagram depicting another example of network communications.

FIG. 4 is a network diagram depicting another example of network communications. As previously described with reference to FIG. 3, a client device may establish a TCP/IP connection with a first networking device via a three-way handshake including exchange of SYN, SYN-ACK, and ACK messages over a first communication path of a wide area network. In at least some implementations, the first networking device may obtain first diagnostic information based on a round trip time between sending the ACK message to the client device and receiving the SYN-ACK message from the client device. Alternatively or additionally, the first networking device may perform an Internet Control Message Protocol trace route of at least a portion of the first communication path between the first networking device and the client device to obtain the diagnostic information for the first communication path.

The client device, after establishing the TCP/IP connection with the first networking device, may send an HTTP GET message to the first networking device to request a network resource. The first networking device, in response to receiving the request for the network resource from the client device, may request the network resource from the first server. The first server may respond to the request for the network resource from the first networking device by sending a response message to the first networking device that includes the network resource such as an HTTP 200 OK message, for example.

The first networking device may receive the network resource from the first server. The network resource may include one or more references to one or more objects. The first networking device may rewrite the network resource to modify one or more of the references and/or may rewrite the network resource to add one or more references to one or more other objects. The first networking device may send the rewritten network resource to the client device as an HTTP 200 OK message. The rewritten network resource may direct the client device to request one or more objects referenced by the rewritten network resource (e.g., via an added reference or rewritten reference) from a second networking device.

The client device receives the rewritten network resource from the first networking device via the first communication path. The client device interprets the one or more references of the rewritten network resource, and requests one or more of the referenced objects by traversing the one or more references. At least one of the references modified or added by the first networking device directs the client device to request an object from the second networking device via a second communication path. In this way, the second networking device or client device may establish a second communication path for which second diagnostic information may be obtained.

For example, the client device may establish a TCP/IP connection with the second networking device via a three-way handshake including exchange of SYN, SYN-ACK, and ACK messages over the second communication path of the wide area network. After establishing the TCP/IP connection with the second networking device, the client sends an HTTP GET request for the object referenced by the rewritten network resource. The second networking device responds to the request with the requested object, for example, as an HTTP 200 OK message. The object received by the client device may cause the client device to send an ACK message to the second networking device via the second communication path. The second networking device may measure or identify the second diagnostic information based, at least in part, on the round trip time of the 200 OK message and ACK message, for example.

The second networking device sends the second diagnostic information for the second communication path to the first networking device via the wide area network as a diagnostic report message. The first networking device receives the diagnostic report message sent by the second networking device via the wide area network. The first networking device compares the first diagnostic information for the first communication path and the second diagnostic information for the second communication path to obtain a result.

Based on the result of the comparison of the first and second diagnostic information, the first networking device may maintain the first communication path by serving or continuing to serve data of the network resource, data of one or more objects referenced by the network resource, or other suitable data requested by the client device to the client device at the first networking device as indicated at 410, or may change the communication path by rewriting data sent to the client device or by redirecting service for the client device to the second networking device as indicated at 420.

In at least some implementations, the second networking device serves data to the client device in response to receiving requests by the client. The data may be retrieved by the second networking device from the second server as indicated at 430, or may be retrieved by the second networking device from the first networking device as indicated at 440. The requested data may be sent by the second networking device to the client device via the second communication path.

As previously described with reference to FIG. 1, first and second networking devices may each send, to a third networking device, respective first and second diagnostic information for first and second communication paths to a client device or other suitable network node. The third networking device receives the first and second diagnostic information sent by the first and second networking devices respectively. The third networking device compares the first diagnostic information and the second diagnostic information to obtain a result. The third networking device selects the first networking device or the second networking device to provide service to the client device based, at least in part, on the result of the comparison of first diagnostic information and second diagnostic information.

If the selected networking device is different than the first networking device with which the client device is communicating or attempting to communicate, then the third networking device sends a transfer message to the first networking device to redirect the client device to the second networking device. The first networking device receives the transfer message sent by the third networking device via the wide area network. The transfer message indicates the identity of the second networking device. The first networking device sends a redirect message to the client device via the first communication path of the wide area network to cause the client device to request data from the second networking device as previously described.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A network communications method, comprising:
  receiving, at a first networking device, a request for a network resource from a client device via a first communication path of a wide area network, the first networking device being a load balancer equipped in a first data center and configured to balance a request load which originates from a plurality of client devices including the client device, among a plurality of servers in the first data center, and being connectable to a first server of the plurality of servers in the first data center, the first server configured to serve a first instance of the network resource requested by the client device via the first networking device;
  at the first networking device, obtaining first diagnostic information indicating an amount of transmission delay or packet loss for communications transmitted through a plurality of intermediate networking devices of at least a portion of the first communication path;

obtaining second diagnostic information indicating an amount of transmission delay or packet loss for communications transmitted through a plurality of intermediate networking devices of at least a portion of a second communication path of the wide area network between the client device and a second networking device, the second networking device being a load balancer configured to balance a request load among a second plurality of servers in a second data center, and being connectable to a second server in the second data center, the second server configured to serve a second instance of the network resource via the second networking device, wherein obtaining the second diagnostic information comprises:

sending a request for the second diagnostic information from the first networking device to the second networking device;

performing an Internet Control Message Protocol trace route of at least the portion of the second communication path between the second networking device and the client device to obtain the second diagnostic information for the second communication path; and receiving from the second networking device, in response to the request for the second diagnostic information, a response that includes the second diagnostic information; and at the first networking device, comparing the first diagnostic information and the second diagnostic information to estimate whether the second communication path will enable faster transmission of communications to the client device than the first communication path, and if so serving data to the client device from the second networking device via the second communication path;

wherein serving data to the client device from the second networking device is accomplished at least in part by:

updating the network resource at the first networking device to modify a network address of one or more of the objects referenced by the network resource to cause the client device to request, via the second communication path, the one or more objects at the modified network address in response to receiving the network resource from the first networking device via the first communication path, the modified network address corresponding to a network address of the second networking device or the second server connectable to the second networking device; or sending a redirect message from the first networking device to client device redirecting the client device from the first networking device to the second networking device to facilitate serving the data to the client device by the second networking device via the second communication path.

2. The method of claim 1, if the first communication path is estimated by comparing the first diagnostic information and the second diagnostic information to enable faster transmission of communications to the client device than the second communication path, then serving data to the client device from the first networking device via the first communication path.

3. The method of claim 1, wherein obtaining the first diagnostic information comprises measuring a round trip time at the first networking device for the communications transmitted through the plurality of intermediate networking devices of at least the portion of the first communication path between the first networking device and the client device.

4. The method of claim 1, where the first diagnostic information and the second diagnostic information each comprise one or more of latency indicating data, performance indicating data, or congestion indicating data.

5. The method of claim 1, wherein obtaining the second diagnostic information additionally comprises:

updating the network resource to add a reference to an additional object or modify a network address of one or more of the objects referenced by the network resource to cause the client device to request, via the second communication path, the one or more objects at the modified network address or the additional object, the modified network address or the reference to the additional object corresponding to a network address of the second networking device or the second server connectable to the second networking device; and receiving the second diagnostic information from the second networking device, the second diagnostic information, based at least in part, on a round trip time for communication sent and received through at least the portion of the second communication path between the second networking device and the client device for the additional object, or one or more objects having a modified reference.

6. The method of claim 1, further comprising: determining that the signal transmission delay or the packet loss exists in at least the portion of the first communication path based, at least in part, on the first diagnostic information; and wherein obtaining the first diagnostic information or obtaining the second diagnostic information comprises obtaining the first diagnostic information or obtaining the second diagnostic information at the first networking device in response to determining that the signal transmission delay or the packet loss exists in at least the portion of the first communication path.

7. The method of claim 6, where determining that transmission delay or packet loss exists comprises:

statistically analyzing a group of connections to client devices handled by the first networking device; and identifying outlying connection states of the group of connections analyzed; or where determining that transmission delay or packet loss exists comprises:

comparing the first diagnostic information to one or more predetermined thresholds indicating that transmission delay or packet loss exists.

8. The method of claim 1, wherein serving data to the client device from the second networking device comprises:

duplicating at the second networking device, a session state between the client device and the first networking device.

9. The method of claim 1, wherein serving data to the client device from the second networking device additionally comprises:

forwarding requests received from the client device via the second communication path at the second networking device to the first networking device for processing;

receiving, at the first networking device, the forwarded requests from the second networking device; and responding to the forwarded requests by sending responses to the second networking device, the second networking device being configured to forward the responses to the client device via the second communication path.

10. A first networking device connectable to a first server in a first data center and to a client device via a wide area network, comprising:

one or more processors; and a storage device having instructions stored thereon executable by the one or more processors to:

receive a request for a network resource from the client device via a first communication path of the wide area network, the first server configured to serve a first instance of the network resource requested by the client device via the first networking device, wherein the first networking device is a load balancer configured to balance a request load which originates from a plurality of client devices including the client device, among a plurality of servers including the first server in a first data center;

obtain first diagnostic information indicating an amount of transmission delay or packet loss for communications transmitted through a plurality of intermediate networking devices of at least a portion of the first communication path;

obtain second diagnostic information from a second networking device indicating an amount of transmission delay or packet loss for communications transmitted through a plurality of intermediate networking devices of at least a portion of a second communication path of the wide area network between the client device and the second networking device being connectable to a second server in a second data center, the second server configured to serve a second instance of the network resource via the second networking device, wherein the second networking device is a load balancer configured to balance a request load which originates from a plurality of client devices, among a plurality of servers including the second server in a second data center, wherein the second diagnostic information is obtained by:

sending a request for the second diagnostic information from the first networking device to the second networking device;

performing an Internet Control Message Protocol trace route of at least the portion of the second communication path between the second networking device and the client device to obtain the second diagnostic information for the second communication path; and receiving from the second networking device, in response to the request for the second diagnostic information, a response that includes the second diagnostic information; and compare the first diagnostic information and the second diagnostic information to estimate whether the second communication path will enable faster transmission of communications to the client device than the first communication path, and if so:

send a redirect message to the client device to cause the client device to request data of the network resource or data of objects referenced by the network resource from the second networking device via the second communication path; or update the network resource to modify a network address of one or more of the objects referenced by the network resource to cause the client device to request, via the second communication path, the one or more objects at the modified network address in response to receiving the network resource from the first networking device via the first communication path, the modified network address corresponding to a network address of the second networking device or the second server connectable to the second networking device.

11. The first networking device of claim 10, wherein the instructions are further executable by the one or more processors to:
send session state information to the second networking device, the session state information indicating a session state between the client device and the first networking device, the session state information enabling the second networking device to duplicate, at the second networking device, the session state between the client device and the first networking device.

12. The first networking device of claim 10, wherein the instructions are further executable by the one or more processors to:
if the first communication path is estimated by comparing the first diagnostic information and the second diagnostic information to enable faster transmission of communications to the client device than the second communication path, then serving data of the network resource or data of objects referenced by the network resource to the client device from the first networking device via the first communication path.

13. The networking device of claim 10, wherein the instructions are further executable by the one or more processors to obtain the first diagnostic information by measuring a round trip time at the first networking device for the communications transmitted through the plurality of intermediate networking devices of at least the portion of the first communication path between the first networking device and the client device.

14. The first networking device of claim 10, where the first diagnostic information and the second diagnostic information each comprise one or more of latency indicating data, performance indicating data, or congestion indicating data; and
wherein the instructions are further executable by the one or more processors to obtain the second diagnostic information from the second networking device by sending a request for the second diagnostic information to the second networking device; receive from the second networking device, in response to the request for the second diagnostic information, a response that includes the second diagnostic information.

15. The first networking device of claim 10, wherein the instructions are further executable by the one or more processors to:
update the network resource to add a reference to an additional object or modify a network address of one or more of the objects referenced by the network resource to cause the client device to request, via the second communication path, the one or more objects at the modified network address or the additional object, the modified network address or the reference to the additional object corresponding to a network address of the second networking device or the second server connectable to the second networking device.

\* \* \* \* \*